(12) United States Patent
Kusano et al.

(10) Patent No.: US 9,148,793 B2
(45) Date of Patent: Sep. 29, 2015

(54) RADIO COMMUNICATION SYSTEM, RADIO BASE STATION, AND COMMUNICATION CONTROL METHOD

(75) Inventors: Yoshimasa Kusano, Yokohama (JP); Chiharu Yamazaki, Ota-ku (JP); Taku Nakayama, Yamato (JP); Shingo Joko, Kawasaki (JP); Kazutaka Nakamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 198 days.

(21) Appl. No.: 13/700,125

(22) PCT Filed: May 27, 2011

(86) PCT No.: PCT/JP2011/062281
§ 371 (c)(1),
(2), (4) Date: Nov. 26, 2012

(87) PCT Pub. No.: WO2011/149086
PCT Pub. Date: Dec. 1, 2011

(65) Prior Publication Data
US 2013/0072184 A1   Mar. 21, 2013

(30) Foreign Application Priority Data
May 27, 2010   (JP) .................................. 2010-122146

(51) Int. Cl.
*H04W 24/00* (2009.01)
*H04B 15/00* (2006.01)
(Continued)

(52) U.S. Cl.
CPC .............. *H04W 16/28* (2013.01); *H04W 24/02* (2013.01); *H04W 28/04* (2013.01); *H04W 36/00* (2013.01); *H04W 92/20* (2013.01)

(58) Field of Classification Search
CPC .............................. H04W 24/00; H04W 24/08
USPC ......................................................... 455/423
See application file for complete search history.

(56) References Cited

U.S. PATENT DOCUMENTS

2007/0281683 A1* 12/2007 Goulet et al. ................. 455/423
2009/0323530 A1* 12/2009 Trigui et al. .................. 370/235
(Continued)

FOREIGN PATENT DOCUMENTS

WO    2009/008789 A1   1/2009
WO    2009/057544 A1   5/2009

OTHER PUBLICATIONS

An Office Action; "Notice of Reasons for Rejection," issued by the Japanese Patent Office on Mar. 11, 2014, which corresponds to Japanese Patent Application No. 2010-122146 and is related to U.S. Appl. No. 13/700,125; with English language statement of relevance.

(Continued)

*Primary Examiner* — Lester Kincaid
*Assistant Examiner* — Andy Gu
(74) *Attorney, Agent, or Firm* — Studebaker & Brackett PC (57) ABSTRACT

Upon receipt of an RLF Indication message indicating a failure in a handover where a radio base station eNB10-1 is the handover source from the other radio base station eNB, the radio base station eNB10-1 can recognize that its coverage is not adjusted appropriately by referring to the RLF Indication message. Moreover, the radio base station eNB10-1 can adjust coverage appropriately by expanding the radiation area of the antenna 101 whose radiation area is directed toward the other radio base station eNB being the handover target, among the antennas 101 included in the radio base station eNB10-1.

6 Claims, 4 Drawing Sheets

(51) Int. Cl.
*H04W 16/28* (2009.01)
*H04W 24/02* (2009.01)
*H04W 28/04* (2009.01)
*H04W 36/00* (2009.01)
*H04W 92/20* (2009.01)

(56) References Cited

U.S. PATENT DOCUMENTS

| | | | |
|---|---|---|---|
| 2010/0173633 A1* | 7/2010 | Catovic et al. | 455/436 |
| 2010/0178929 A1* | 7/2010 | Kennedy et al. | 455/456.1 |
| 2010/0216485 A1* | 8/2010 | Hoole | 455/452.2 |
| 2010/0273487 A1* | 10/2010 | Alonso-Rubio et al. | 455/436 |
| 2010/0291931 A1 | 11/2010 | Suemitsu et al. | |
| 2010/0298015 A1 | 11/2010 | Medbo et al. | |
| 2012/0165022 A1* | 6/2012 | Rimhagen et al. | 455/437 |

OTHER PUBLICATIONS

NEC et al.; 3GPP TSG-RAN WG2; UE assistance for self-optimizing of network; Orlando, USA; Jun. 25-29, 2007; R2-072432.

Huawei; 3GP TSG RAN WG2 Meeting #67bis; Requirements of eNB as an internal LCS client; Miyazaki, Japan; Oct. 12-16, 2009; R2-095703.

Motorola et al.; 3GPP TSG-RAN WG2 Meeting #68; Introduction of MRO procedures in stage 2; Jeju, Korea; Nov. 9-13, 2009; R2-097533.

3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).

International Search Report; PCT/JP2011/062281; Jun. 21, 2011.

* cited by examiner

FIG. 3

RADIO COMMUNICATION SYSTEM, RADIO BASE STATION, AND COMMUNICATION CONTROL METHOD

TECHNICAL FIELD

The present invention relates to a radio communication technique, and more particularly relates to a radio communication system, a radio base station, and a communication control method to which SON is applied.

BACKGROUND ART

In LTE (Long Term Evolution) standardized in 3GPP (3rd Generation Partnership Project) which is a standardization organization for radio communication systems, techniques called SON (Self Organizing Network) are employed. SON is expected to automate measurement and settings in fields without requiring human intervention for installation and maintenance of a radio base station (see Non-Patent Literature 1, for example).

In SON, there is proposed a method by which coverage being a communication area of a radio base station (referred to as "eNB" in 3GPP) is adjusted by appropriately setting handover parameters which are base station parameters, and thereby reducing the number of failed handovers between radio base stations. Such a method is referred to as MRO (Mobility Robustness Optimization).

CITATION LIST

Non-Patent Literature

Non-Patent Literature 1: 3GPP TR 36.902 V9.1.0, March 2010

SUMMARY OF THE INVENTION

However, in the aforementioned MRO method, complicated control is required in adjusting handover parameters. Hence, there is a demand for simple coverage adjustment.

Against this background, an objective of the present invention is to provide a radio communication system, a radio base station, and a communication control method capable of adjusting coverage of a radio base station in a simple manner.

In order to solve the aforementioned problem, the present invention has following features. The characteristic of the present invention is summarized as follows. A radio communication system comprises a first radio base station (radio base station eNB10-1) and a second radio base station (radio base station eNB10-2), wherein the second radio base station comprises a transmitter (X2 interface communication unit 140) configured to send the first radio base station handover failure information indicating that a failure occurs in a handover in which the first radio base station is involved, and the first radio base station comprises: an antenna (antenna 101*a*, antenna 101*b*, antenna 101*c*); a receiver (X2 interface communication unit 140) configured to receive the handover failure information from the second radio base station; and a controller (radiation area adjustment controller 122) configured to adjust a radiation area of the antenna according to the handover failure information received by the receiver.

According to such a characteristic, the first radio base station can recognize that its coverage is not adjusted appropriately, by referring to the handover failure information sent from the second radio base station, indicating that a failure occurs in the handover in which the first radio base station is involved. Moreover, the first radio base station can adjust the radiation area of the antenna of the first radio base station to adjust coverage appropriately.

The characteristic of the present invention is summarized as follows. A radio base station comprises: an antenna; a receiver configured to receive first handover failure information from a first other radio base station and/or a radio terminal; and a controller configured to adjust a radiation area of the antenna according to the first handover failure information received by the receiver, wherein the first handover failure information is information indicating that a failure occurs in a handover in which the radio base station is involved.

The characteristic of the present invention is summarized as follows. The radio base station further comprises a transmitter configured to send second handover failure information to a second other radio base station, wherein the second handover failure information is information indicating that a failure occurs in a handover in which the second other radio base station is involved.

The characteristic of the present invention is summarized as follows. The controller adjusts the radiation area of the antenna corresponding to a certain sector among sectors of the radio base station, according to the first handover failure information.

The characteristic of the present invention is summarized as follows. The controller adjusts the radiation area of the antenna by referring to a history of the first handover failure information.

The characteristic of the present invention is summarized as follows. The controller makes an adjustment so that the larger the rate of handover failure indicated by the history of the first handover failure information is, the wider the radiation area of the antenna is expanded.

The characteristic of the present invention is summarized as follows. The controller adjusts a tilt angle of the antenna to adjust the radiation area of the antenna.

The characteristic of the present invention is summarized as follows. A communication control method for a radio base station includes an antenna, comprises the steps of: receiving handover failure information from another radio base station and/or a radio terminal; and adjusting a radiation area of the antenna according to the received first handover failure information, wherein the handover failure information is information indicating that a failure occurs in a handover in which the radio base station is involved.

Next, with reference to the drawings, an embodiment of the present invention is described. Specifically, the description is given in order of: (1) Outline of LTE System; (2) Configuration of Radio Communication System; (3) Configuration of Radio Base Station; (4) Operation of Radio Communication System; (5) Effects and Advantages; and (6) Other Embodiments. In the drawings of the embodiments, the same or similar reference numerals are applied to the same or similar parts.

(1) Outline of LTE System

Figure 1:
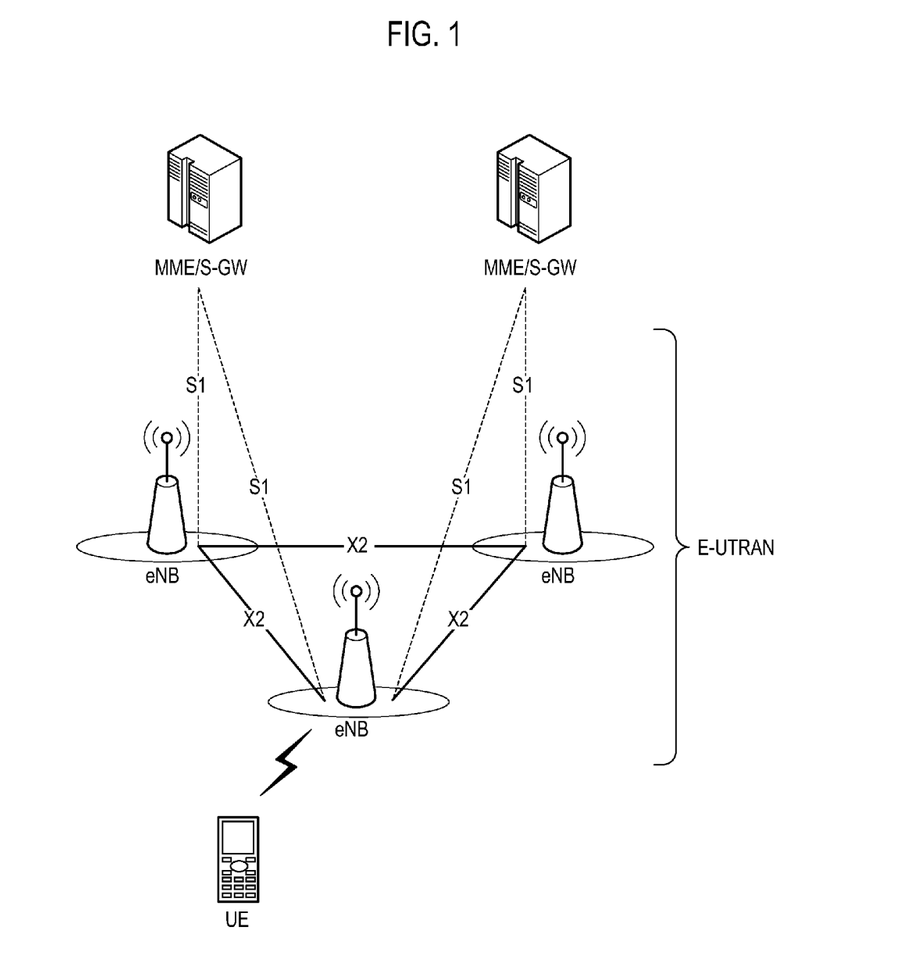
FIG. 1 is a diagram for describing an outline of an LTE system.

FIG. 1 is a diagram for describing an outline of an LTE system. As shown in FIG. 1, multiple radio base stations eNB form an E-UTRAN (Evolved-UMTS Terrestrial Radio Access Network). Each of the multiple radio base stations eNB forms a cell which is a communication area for providing a service to radio terminals UE.

A radio terminal UE is a radio communication device held by a user, and is also referred to as a user device. The radio terminal UE measures quality of a radio signal (i.e., radio quality) received from the radio base station eNB, and sends a report (referred to below as a measurement result report) on the result of radio quality measurement to the radio base station eNB to which the radio terminal UE connects.

Examples of such radio quality include reference signal received power (RSRP) and signal to interference and noise power ratio (SINR). A measurement result report on RSRP is referred to as a measurement report, while a measurement result report on an index of SINR is referred to as a CQI (Channel Quality Indicator).

The radio base station eNB to which the radio terminal UE connects performs handover control for switching a connection destination of the radio terminal UE according to a measurement report received from the radio terminal UE. In a case where the radio terminal UE receives reference signals from multiple radio base stations eNB, the measurement report includes multiple RSRPs of the multiple radio base stations eNB. The radio base station eNB to which the radio terminal UE connects normally selects the radio base station eNB having the highest RSRP among the multiple radio base stations eNB as the connection destination of the radio terminal UE.

Moreover, the radio base station eNB to which the radio terminal UE connects allocates resource blocks, each of which being a unit for radio resource allocation to the radio terminal UE, by referring to CQI received from the radio terminal UE. Moreover, the radio base station eNB to which the radio terminal UE connects determines a modulation class for use in radio communication with the radio terminal UE, by referring to the CQI received from the radio terminal UE. A modulation class is a combination of a modulation level and a coding rate.

The radio base stations eNB are capable of communicating with each other via an X2 interface being a logical communication path providing inter-base station communication. Each of the multiple radio base stations eNB can communicate with an EPC (Evolved Packet Core), namely, an MME (Mobility Management Entity) or an S-GW (Serving Gateway) via an S1 interface.

(2) Configuration of Radio Communication System

Figure 2:
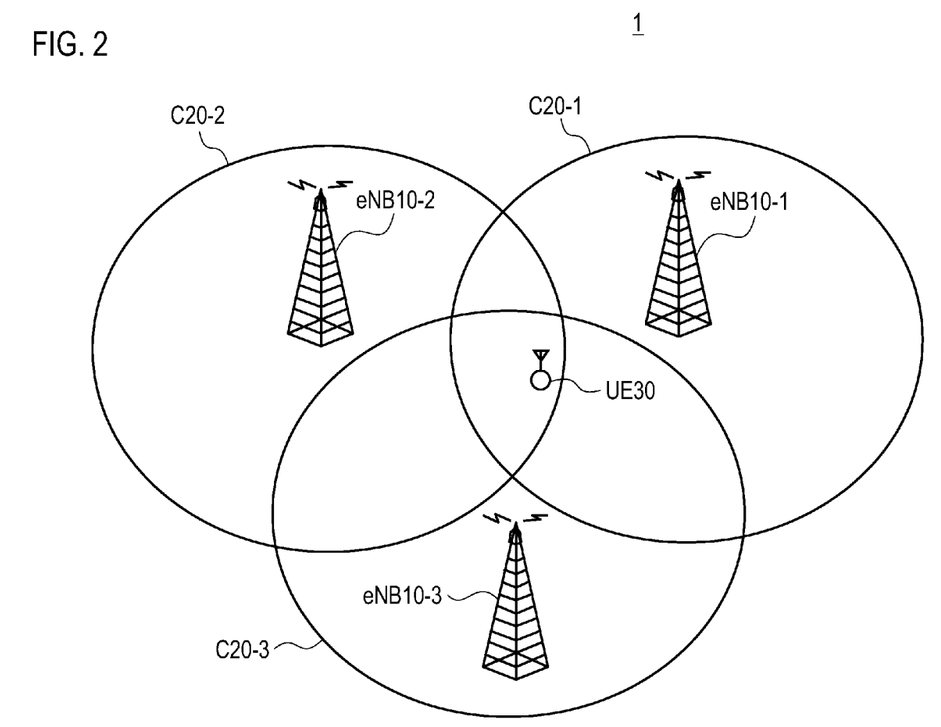
FIG. 2 is a schematic configuration diagram of a radio communication system of an embodiment of the present invention.

FIG. 2 is a schematic configuration diagram of a radio communication system 1 of this embodiment.

As shown in FIG. 2, the radio communication system 1 includes a radio base station eNB10-1 forming a cell C20-1, a radio base station eNB10-2 forming a cell C20-2, a radio base station eNB10-3 forming a cell C20-3, and a radio terminal UE30. The radio base station eNB10-1, the radio base station eNB10-2, and the radio base station eNB10-3 can perform inter-base station communication using the aforementioned X2 interface.

In this embodiment, the radio base station eNB10-1 serves as a first radio base station, and the radio base station eNB10-2 serves as a second radio base station. Note that although only a single radio terminal UE30 is shown in FIG. 2, there are actually multiple radio terminals UE30.

In this embodiment, each radio base station eNB can recognize a failure in a handover where the radio base station eNB is the handover source by referring to an RLF (Radio Link Failure) Indication message. An RLF Indication message is handover failure information exchanged between the radio base stations eNB and indicating a failure in a handover. When a failure occurs in a handover where the radio base station eNB is the handover source, the radio base station eNB expands a radiation area of its internal antenna to expand its coverage being a communication area.

For example, assume that the radio terminal UE 30 fails in a handover where the radio base station eNB10-1 is the handover source and the radio base station eNB10-3 is the handover target, and reconnects to the radio base station eNB10-2. In this case, the reconnection destination radio base station eNB10-2 sends an RLF Indication message via an X2 interface to the radio base station eNB10-1 being the handover source in the failed handover. Referring to the received RLF Indication message, the radio base station eNB10-1 can recognize a failure in the handover where the radio base station eNB10-1 is the handover source. The radio base station eNB10-1 then expands the radiation area of its internal antenna toward the radio base station eNB10-3.

(3) Configuration of Radio Base Station

Figure 3:
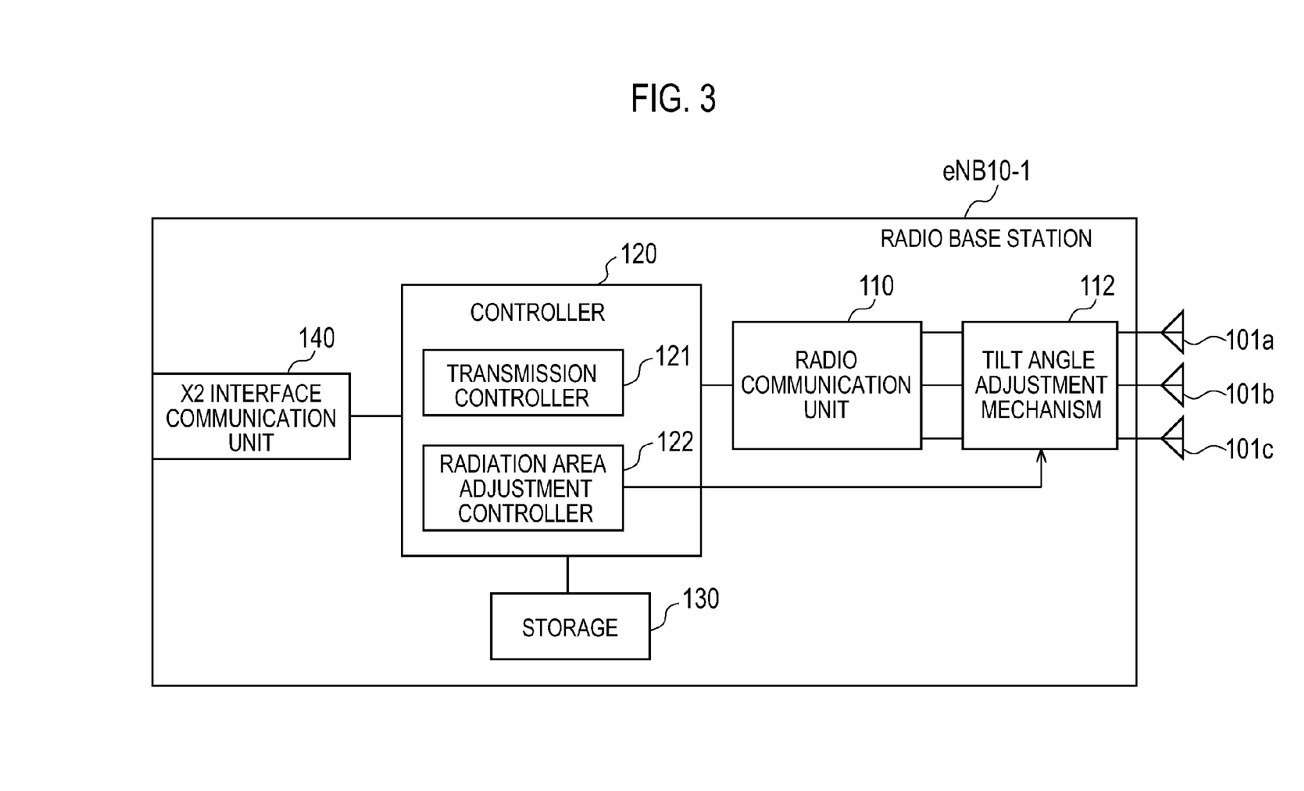
FIG. 3 is a block diagram showing a configuration of the radio base station eNB10-1 of the embodiment of the present invention.

Next, a description is given of a configuration of the radio base station eNB10-1. FIG. 3 is a block diagram showing a configuration of the radio base station eNB10-1 of this embodiment. Note that the radio base station eNB10-2 and the radio base station eNB10-3 also have the same configuration.

As shown in FIG. 3, the radio base station eNB10-1 includes an antenna 101a, an antenna 101b, an antenna 101c, a radio communication unit 110, a tilt angle adjustment mechanism 112, a controller 120, a storage 130, and an X2 interface communication unit 140.

Each of the antenna 101a, the antenna 101b, and the antenna 101c radiates radio signals in a direction which is different from one another, and receives radio signals from the direction. In this embodiment, each of the antenna 101a, antenna 101b, and antenna 101c is in one-to-one correspondence with a sector.

The antenna 101a, the antenna 101b, and the antenna 101c are used to send and receive radio signals. The radio communication unit 110 is formed of a radio frequency (RF) circuit, a baseband (BB) circuit and the like, for example, and exchanges radio signals with the radio terminal UE via the antenna 101a, the antenna 101b, and the antenna 101c. In addition, the radio communication unit 110 modulates transmission signals and demodulates reception signals. The tilt angle adjustment mechanism 112 adjusts a tilt angle of each of the antenna 101a, antenna 101b, and antenna 101c (hereinafter where appropriate called "antenna 101").

The controller 120 is formed of a CPU, for example, and controls various functions of the radio base station eNB10-1. The storage 130 is formed of a memory, for example, and stores therein various kinds of information used for control and the like of the radio base station eNB10-1. The X2 interface communication unit 140 performs inter-base station communication with the radio base station eNB10-2 and the radio base station eNB10-3 by use of the X2 interface.

The controller 120 includes a transmission controller 121 and a radiation area adjustment controller 122.

When a failure occurs in a handover, first processing, second processing, and third processing described below are performed in the radio base station eNB10-1. Here, a failure in a handover includes cases where (a) radio communication of the radio terminal UE30 is disconnected due to deterioration in radio quality (such as RSRP) between the radio terminal UE30 and the handover source before the connection destination of the radio terminal UE30 is switched to the handover target, (b) radio communication of the radio terminal UE30 is disconnected, since the connection destination of the radio terminal UE30 is switched to the handover target before radio quality between the radio terminal UE30 and the handover target is improved, and (c) the radio terminal UE30 reconnects to the handover source due to deterioration in radio quality between the radio terminal UE30 and the handover target during processing for switching the connection destination of the radio terminal UE 30 from the handover source to the handover target.

(First Processing)

When a failure occurs in a handover where the radio base station eNB other than the radio base station eNB10-1 is the handover source, the radio terminal UE30 having attempted to perform the handover may be required to newly connect to the radio base station eNB10-1.

At the time of connecting to the radio base station eNB10-1, the radio terminal UE30 sends a connection request (position registration request) message. The connection request message includes a PCI (referred to below as a handover source PCI) which is identification information on the radio base station eNB being the handover source in the failed handover, and a PCI (referred to below as a handover target PCI) which is identification information on the radio base station eNB being the handover target in the failed handover.

The controller 120 receives the connection request message via the antenna 101 and the radio communication unit 110. The controller 120 performs processing to connect the radio terminal UE30 in response to the connection request message.

The transmission controller 121 extracts the handover source PCI and the handover target PCI included in the connection request message. The transmission controller 121 generates an RLF Indication message as handover failure information including the handover target PCI. Other than the handover target PCI, the RLF Indication message includes ECGI which is identification information on the radio base station eNB10-1.

The transmission controller 121 outputs the generated RLF Indication message to the X2 interface communication unit 140, as well as controls the X2 interface communication unit 140 so that the X2 interface communication unit 140 sends the RLF Indication message to the radio base station eNB identified by the handover source PCI.

Controlled by the transmission controller 121, the X2 interface communication unit 140 sends the RLF Indication message to the radio base station eNB identified by the handover source PCI via the X2 interface.

(Second Processing)

When a failure occurs in a handover where the radio base station eNB10-1 is the handover source and the radio terminal UE30 having attempted to perform the handover newly connects to another radio base station eNB, the other radio base station performs the above first processing to send an RLF Indication message to the radio base station eNB10-1. The RLF Indication message includes a PCI (handover target PCI) which is identification information on the radio base station being the handover target in the failed handover.

The X2 interface communication unit 140 receives the RLF Indication message from the other radio base station eNB via the X2 interface. Moreover, the X2 interface communication unit 140 outputs the RLF Indication message to the radiation area adjustment controller 122.

When the RLF Indication message is inputted, the radiation area adjustment controller 122 extracts the handover target PCI included in the RLF Indication message. The extracted handover target PCI is a PCI of the radio base station eNB being the handover target in the failed handover where the radio base station eNB10-1 is the handover source.

The numbers of past successful and failed handovers where the radio base station eNB10-1 is the handover source are stored for each handover target PCI in the storage 130. The radiation area adjustment controller 122 increments by one the number of failed handovers stored for the handover target PCI extracted from the RLF Indication message.

The radiation area adjustment controller 122 reads the numbers of successful and failed handovers for the handover target PCI extracted from the RLF Indication message, from the storage 130. The radiation area adjustment controller 122 obtains a sum of the read numbers of successful and failed handovers. Then, the radiation area adjustment controller 122 divides the number of failed handovers by the sum of the numbers of successful and failed handovers. The value obtained by the division indicates a handover failure rate of handovers where the radio base station eNB10-1 is the handover source and the other radio base station eNB identified by the handover target PCI extracted from the RLF Indication message is the handover target.

The radiation area adjustment controller 122 calculates a tilt angle of the antenna 101 corresponding to the handover failure rate. Specifically, the radiation area adjustment controller 122 calculates the tilt angle so that the higher the handover failure rate is, the wider the radiation area is expanded.

The radiation area adjustment controller 122 determines a direction of the other radio base station eNB relative to the radio base station eNB10-1 as an expansion direction of the radiation area, the other radio base station eNB being identified by the handover target PCI extracted from the RLF Indication message. For example, positional information (latitude and longitude) on the radio base station eNB10-1 and positional information (latitude and longitude) on the other radio base station eNB are stored in the storage 130. The radiation area adjustment controller 122 can determine the expansion direction of the radiation area according to these pieces of positional information.

The radiation area adjustment controller 122 determines the antenna 101 radiating radio signals in the expansion direction of the radiation area as the antenna 101 targeted for tilt-angle adjustment. The radiation area adjustment controller 122 controls the tilt angle adjustment mechanism 112 so that the tilt angle adjustment mechanism 112 sets the calculated value as the tilt angle of the antenna 101 targeted for tilt-angle adjustment. Controlled by the radiation area adjustment controller 122, the tilt angle adjustment mechanism 112 sets the calculated value as the tilt angle of the antenna 101 targeted for tilt-angle adjustment.

(Third Processing)

In some cases, a failure occurs in a handover where the radio base station eNB10-1 is the handover source, and the radio terminal UE30 having attempted to perform the handover reconnects to the handover source radio base station eNB10-1. In such a case, at the time of reconnecting to the radio base station eNB10-1, the radio terminal UE30 sends a connection request message as handover failure information including a handover target PCI.

The controller 120 receives the connection request message via the antenna 101 and the radio communication unit 110. In response to the connection request message, the controller 120 performs processing for connecting the radio terminal UE30.

The radiation area adjustment controller 122 extracts the handover target PCI included in the connection request message. The extracted handover target PCI is a PCI of the radio base station eNB being the handover target in the failed handover where the radio base station eNB10-1 is the handover source.

The numbers of past successful and failed handovers where the radio base station eNB10-1 is the handover source are stored for each handover target PCI in the storage 130. The radiation area adjustment controller 122 increments the number of failed handovers by one for the handover target PCI extracted from the connection request message.

Thereafter, the same processing as the first processing is performed. To be specific, the radiation area adjustment controller 122 reads the numbers of successful and failed handovers for the handover target PCI extracted from the connection request message, from the storage 130. The radiation area adjustment controller 122 obtains a sum of the read numbers of successful and failed handovers. Then, the radiation area adjustment controller 122 divides the number of failed handovers by the sum of the numbers of successful and failed handovers. Thus obtained is a handover failure rate of handovers where the radio base station eNB10-1 is the handover source, and the other radio base station eNB identified by the handover target PCI extracted from the connection request message is the handover target.

The radiation area adjustment controller 122 calculates a tilt angle so that the higher the handover failure rate is, the wider the radiation area is expanded, for the antenna 101 corresponding to the handover failure rate.

The radiation area adjustment controller 122 determines a direction of the other radio base station eNB relative to the radio base station eNB10-1 as an expansion direction of the radiation area, the other radio base station eNB being identified by the handover target PCI extracted from the connection request message.

The radiation area adjustment controller 122 determines the antenna 101 radiating radio signals in the expansion direction of the radiation area as the antenna 101 targeted for tilt-angle adjustment. The radiation area adjustment controller 122 controls the tilt angle adjustment mechanism 112, so that the tilt angle adjustment mechanism 112 sets the calculated value as the tilt angle of the antenna 101 targeted for tilt-angle adjustment. Controlled by the radiation area adjustment controller 122, the tilt angle adjustment mechanism 112 sets the calculated value as the tilt angle of the antenna 101 targeted for tilt-angle adjustment.

(4) Operation of Radio Communication System

Figure 4:
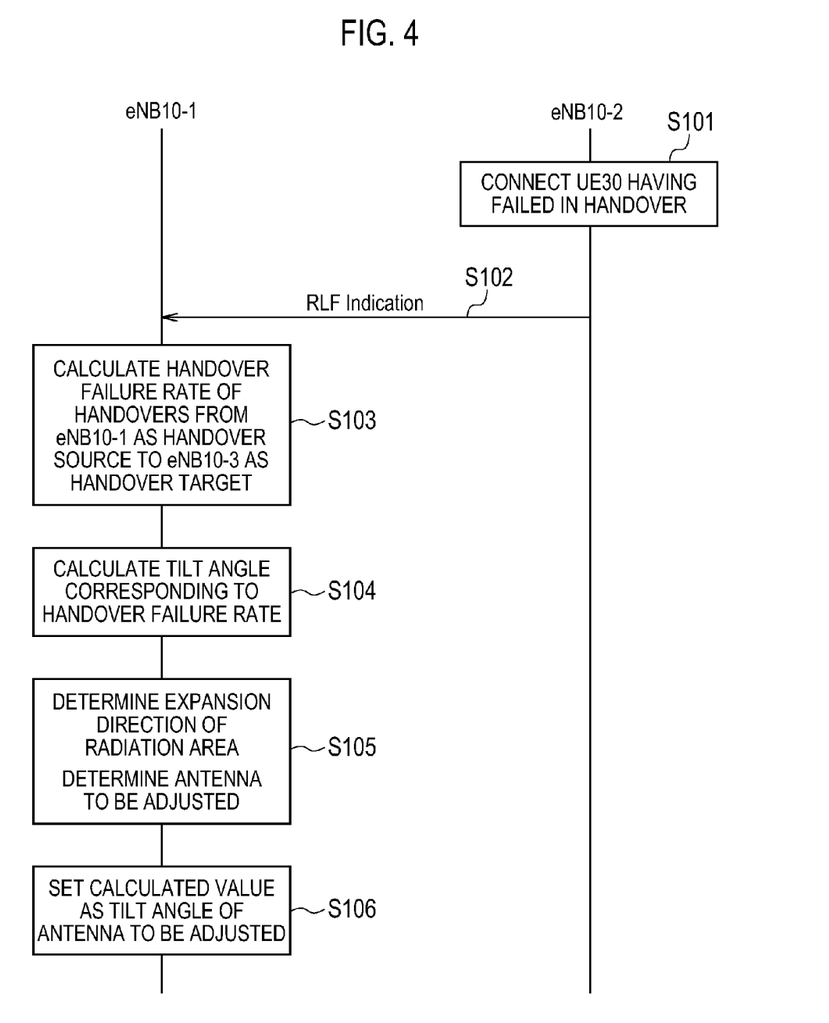
FIG. 4 is an operation sequence chart showing an operation of the radio communication system of the embodiment of the present invention.

FIG. 4 is an operation sequence chart showing an operation of the radio communication system 1 of this embodiment. Hereinafter, a description is given by using an exemplar case in which a failure occurs in a handover where the radio base station eNB10-1 is the handover source and the radio base station eNB10-3 is the handover target.

In step S101, the controller 120 of the radio base station eNB10-2 establish connection with the radio terminal UE30 having failed in the handover.

In step S102, the transmission controller 121 of the radio base station eNB10-2 controls the X2 interface communication unit 140, and the X2 interface communication unit 140 sends an RLF Indication message including a handover target PCI to the radio base station eNB10-1. The X2 interface communication unit 140 of the radio base station eNB10-1 receives the RLF Indication message including the handover target PCI.

In step S103, the radiation area adjustment controller 122 of the radio base station eNB10-1 calculates a handover failure rate of handovers where the radio base station eNB10-1 is the handover source, and the radio base station eNB10-3 is the handover target.

In step S104, the radiation area adjustment controller 122 of the radio base station eNB10-1 calculates a tilt angle of the antenna 101 corresponding to the handover failure rate.

In step S105, the radiation area adjustment controller 122 of the radio base station eNB10-1 determines a direction of the other radio base station eNB relative to the radio base station eNB10-1 as an expansion direction of the radiation area, the other radio base station being identified by the handover target PCI extracted from the RLF Indication message. Moreover, the radiation area adjustment controller 122 of the radio base station eNB10-1 determines the antenna 101 radiating radio signals in the expansion direction of the radiation area as the antenna 101 targeted for tilt-angle adjustment.

In step S106, the radiation area adjustment controller 122 of the radio base station eNB10-1 controls the tilt angle adjustment mechanism 112 so that the tilt angle adjustment mechanism 112 sets the calculated value as the tilt angle of the antenna 101 targeted for tilt-angle adjustment. Controlled by the radiation area adjustment controller, the tilt angle adjustment mechanism 112 sets the calculated value as the tilt angle of the antenna 101 targeted for tilt-angle adjustment.

(5) Effects and Advantages

As has been described, according to this embodiment, upon receipt of an RLF Indication message indicating a failure in a handover where the radio base station eNB10-1 is the handover source from the other radio base station eNB, the radio base station eNB10-1 can recognize that its coverage is not adjusted appropriately by referring to the RLF Indication message. Moreover, the radio base station eNB10-1 can adjust coverage appropriately by expanding the radiation area of the antenna 101 whose radiation area is directed toward the other radio base station eNB being the handover target, among the antennas 101 included in the radio base station eNB10-1.

In addition, upon receipt of a connection request message from the radio terminal UE30, indicating a failure in a handover where the radio base station eNB10-1 is the handover source, the radio base station eNB10-1 can recognize that its coverage is not adjusted appropriately, by referring to the connection request message. Moreover, the radio base station eNB10-1 can adjust coverage appropriately by expanding the radiation area of the antenna 101 whose radiation area is directed toward the other radio base station eNB being the handover target, among the antennas 101 included in the radio base station eNB10-1.

(6) Other Embodiments

As mentioned above, the present invention has been described according to the embodiment. However, it should not be understood that the discussions and the drawings constituting a part of this disclosure limit the present invention.

From this disclosure, various embodiments, examples and operational techniques will be apparent for those skilled in the art.

In the above embodiment, the radio base station eNB10-1 adjusts the tilt angle of the antenna 101 to expand the radiation area of the antenna 101. However, the radio base station eNB10-1 may expand the radiation area of the antenna 101 according to other methods such as increasing the transmission power of the antenna 101. In this case, the radiation area adjustment controller 122 of the radio base station eNB10-1 performs control to adjust the transmission power so that the higher the handover failure rate is, the larger the transmission output (transmission power) of the antenna 101 becomes.

In the above embodiment, when a failure occurs in a handover where the radio base station eNB10-1 is the handover source, the radio base station eNB10-1 adjusts the tilt angle of the internal antenna 101 to expand the radiation area of the antenna 101. Alternatively, the radio base station eNB10-1 may adjust the tilt angle of the internal antenna 101 to expand the radiation area of the antenna 101, when a failure occurs in a handover where the radio base station eNB10-1 is the handover target.

In this case, the other radio base station eNB connecting to the radio terminal UE30 having failed in a handover sends an RLF Indication message including a PCI (Handover source PCI) which is identification information on the handover source radio base station eNB to the handover target radio base station eNB10-1.

The radiation area adjustment controller 122 of the radio base station eNB10-1 extracts the handover source PCI included in the received RLF Indication message. The numbers of past successful and failed handovers where the radio base station eNB10-1 is the handover target are stored for each handover target PCI in the storage 130. The radiation area adjustment controller 122 increments the number of failed handovers by one for the handover source PCI extracted from the RLF Indication message.

The radiation area adjustment controller 122 obtains a sum of the numbers of successful and failed handovers for the handover source PCI extracted from the RLF Indication message. Then, the radiation area adjustment controller 122 divides the number of failed handovers by the sum of the numbers of successful and failed handovers. The value obtained by the division indicates a handover failure rate of handovers where the radio base station eNB10-1 is the handover target, and the other radio base station eNB identified by the handover source PCI extracted from the RLF Indication message is the handover source.

Thereafter, the radiation area adjustment controller 122 calculates a tilt angle of the antenna 101 corresponding to the handover failure rate as in the aforementioned case. The radiation area adjustment controller 122 determines a direction of the other radio base station eNB relative to the radio base station eNB10-1 as an expansion direction of the radiation area, the other radio base station being identified by the handover source PCI extracted from the RLF Indication message. Moreover, the radiation area adjustment controller 122 determines the antenna 101 radiating radio signals in the expansion direction of the radiation area as the antenna 101 targeted for tilt-angle adjustment, and controls the tilt angle adjustment mechanism 112. Controlled by the radiation area adjustment controller 122, the tilt angle adjustment mechanism 112 sets the calculated value as the tilt angle of the antenna 101 targeted for tilt-angle adjustment.

Assume a case where the other radio base station eNB newly connecting to the radio terminal UE30 having failed in a handover sends an RLF Indication message including a handover source PCI and a handover target PCI to both of the handover source radio base station eNB and the handover target radio base station eNB. In this case, both of the handover source radio base station eNB and the handover target radio base station eNB may adjust the tilt angle of the internal antenna 101 to expand the radiation area of the antenna 101.

Instead of the RLF Indication message, a Handover Report message may be sent from the other radio base station eNB to the radio base station eNB10-1. The Handover Report message includes ECGIs being identification information on the radio base station eNB being the handover source and on the radio base station eNB being the handover target in the failed handover. Accordingly, upon receipt of the Handover Report message, the handover source radio base station eNB10-1 can identify the handover target radio base station eNB, and the handover target radio base station eNB10-1 can identify the handover source radio base station eNB.

Note that in LTE Advanced, use of a relay node being a radio base station forming a backhaul by radio waves is planned, and use of an X2 interface for the relay node is also planned. Accordingly, such a relay node may be used as a second radio base station of the present invention.

Although the above embodiment has been described using a case where the backhaul is an X2 interface, the present invention is similarly applicable to a case where the backhaul is an S1 interface or a case where the backhaul includes both an X2 interface and an S1 interface. When the backhaul is an S1 interface, each radio base station eNB is provided with an S1 interface communication unit.

Furthermore, although the above embodiment has been described using an LTE system, the present invention is also applicable to other radio communication systems such as a radio communication system according to WiMAX (IEEE 802.16).

As mentioned above, it should be understood that the present invention includes various embodiments and the like which are not described herein.

Note that the entire content of the Japanese Patent Application No. 2010-122146 (filed on May 27, 2010) is incorporated herein by reference.

INDUSTRIAL APPLICABILITY

As mentioned above, the radio communication system, the radio base station and the communication control method of the present invention is useful for radio communication such as mobile communication, by which coverage of a radio base station can be adjusted in a simple manner.

The invention claimed is:
1. A radio communication system comprising:
a first radio base station;
a second radio base station, wherein the second radio base station comprises a transmitter configured to send the first radio base station handover failure information indicating that a failure occurs in a handover in which the first radio base station is involved;
wherein the first radio base station comprises:
an antenna;
a receiver configured to receive the handover failure information from the second radio base station;
and a controller configured to:
determine a handover failure rate calculated based on a history of the handover failure information received by the receiver,
adjust the radiation area of the antenna according to the handover failure rate, and wherein the controller is configured to make the adjustment in proportionality to the handover failure rate so that the larger the rate of handover failure indicated by the history of the first handover failure information, the wider the radiation area of the antenna is expanded.

2. A radio base station comprising:

an antenna;

a receiver configured to receive first handover failure information from a first other radio base station, the first handover failure information is information indicating that a failure occurs in a handover in which the radio base station is involved;

and a controller configured to:

determine a handover failure rate calculated based on a history of the first handover failure information received by the receiver, adjust the radiation area of the antenna according to the handover failure rate, and wherein the controller is configured to make the adjustment in proportionality to the handover failure rate so that the larger the rate of handover failure indicated by the history of the first handover failure information, the wider the radiation area of the antenna is expanded.

3. The radio base station according to claim 2 further comprising a transmitter configured to send second handover failure information to a second other radio base station, wherein the second handover failure information is information indicating that a failure occurs in a handover in which the second other radio base station is involved.

4. The radio base station according to claim 2, wherein the controller adjusts the radiation area of the antenna corresponding to a certain sector among sectors of the radio base station, according to the first handover failure information.

5. The radio base station according to claim 2, wherein the controller adjusts a tilt angle of the antenna to adjust the radiation area of the antenna.

6. A communication control method for a radio base station including an antenna, comprising the steps of:

receiving, at the radio base station, handover failure information from another radio base station, wherein the handover failure information is information indicating that a failure occurs in a handover in which the radio base station is involved;

determining a handover failure rate calculated based on a history of the received handover failure information;

and adjusting a radiation area of the antenna in proportionality to the handover failure rate, so that the larger the rate of handover failure indicated by the history of the handover failure information, the wider the radiation area of the antenna is expanded.

* * * * *